United States Patent
Hubbard et al.

(10) Patent No.: US 6,262,556 B1
(45) Date of Patent: Jul. 17, 2001

(54) FORCE MOTOR CURRENT CONTROL FOR AN ELECTRONICALLY CONTROLLED AUTOMATIC TRANSMISSION

(75) Inventors: Gregory A Hubbard, Carmel; Jeffrey Kurt Runde, Fishers, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/571,118

(22) Filed: May 12, 2000

(51) Int. Cl.[7] .............................. H02P 5/28; H01H 47/00
(52) U.S. Cl. ...................... 318/798; 318/798; 361/140; 361/161
(58) Field of Search .................................. 318/434, 611, 318/615, 617, 632, 619, 798–812, 471, 472; 361/139, 140, 160, 161

(56) References Cited

U.S. PATENT DOCUMENTS

| | | |
|---|---|---|
| 3,699,989 * | 10/1972 | O'Connor et al. ................. 318/615 |
| 4,070,927 | 1/1978 | Polak . |
| 4,764,711 * | 8/1988 | Deller ................................... 318/619 |
| 4,975,628 | 12/1990 | Lemieux . |
| 5,601,506 | 2/1997 | Long et al. . |
| 6,013,994 * | 1/2000 | Endo et al. .......................... 318/434 |

* cited by examiner

Primary Examiner—Khanh Dang
(74) Attorney, Agent, or Firm—Laura C. Hargitt

(57) ABSTRACT

An improved force motor current control including feed-forward and feed-back control terms summed to determine a force motor activation for achieving a current command. The feed-forward control term estimates the force motor activation required to achieve the current command, based on the force motor temperature, the system voltage and a model of the force motor circuit. The feed-back control term compares an expected response to the actual response and develops a control term that corrects for modeling errors, providing disturbance rejection and improved command following. The closed-loop feedback error is used to enable adaptive correction of the feed-forward control so that the estimated force motor activation more nearly produces the commanded current.

12 Claims, 3 Drawing Sheets

FORCE MOTOR CURRENT CONTROL FOR AN ELECTRONICALLY CONTROLLED AUTOMATIC TRANSMISSION

TECHNICAL FIELD

This invention relates to an electronically controlled automatic transmission, and more particularly to a current control for a force motor used for hydraulic pressure control.

BACKGROUND OF THE INVENTION

In automatic transmissions and other fluid pressure control systems, solenoid force motors are sometimes used to develop a variable hydraulic pilot pressure for adjusting the operating point of a pressure regulator valve. In general, the force motor pressure varies in direct proportion to the average current supplied to the solenoid coil, and a system controller modulates the coil energization to achieve a desired coil current corresponding to the desired hydraulic pressure.

Experience has shown that the solenoid coil current cannot be reliably controlled with conventional open-loop and/or closed-loop control strategies, due to circuit variations (such as wire harness length) and the wide temperature variations of the control valve environment. Typically, the control valve is submersed in hydraulic fluid, the temperature of which can vary from −40° C. to +150° C., resulting in corresponding changes in the solenoid coil resistance. One approach, disclosed in the U.S. Pat. No. 4,975,628 to Lemieux, utilizes a closed-loop integral control, with integrator gain terms being scheduled as a function of the solenoid temperature. On one hand, the control valve temperature can be easily determined by simply measuring the hydraulic fluid temperature, but on the other hand, the solenoid resistance varies so greatly that it is difficult to accurately and dynamically schedule the control gains over the entire operating range of the valve. As a result, it is difficult to achieve fast response while avoiding overshoot and steady-state error.

SUMMARY OF THE INVENTION

The present invention is directed to an improved force motor current control wherein feed-forward and feed-back control terms are summed to determine a force motor activation for achieving a current command. The feed-forward control term estimates the force motor activation required to achieve the current command, based on the hydraulic fluid temperature, the system voltage and a model of the force motor circuit. The feed-back control term compares an expected response to the actual response and develops a control term that corrects for modeling errors, providing disturbance rejection and improved command following. Additionally, the closed-loop feedback error is used to enable adaptive correction of the feed-forward control so that the estimated force motor activation more nearly produces the commanded current.

In a preferred embodiment, the feed-back control term is determined by: delaying and filtering the current command to determine the expected force motor current, determining a current error based on the difference between the measured current and the expected current, and computing a feed-back control term based on the current error using proportional-plus-integral control. The feed-forward control term is determined by: estimating the force motor circuit resistance based on a reference resistance, a reference temperature and a measure of the force motor temperature, skewing the estimated resistance to achieve an over-damped transient response, and computing a feed-forward control term based on the measured system voltage, the current command, and the skewed resistance estimate. The reference resistance and reference temperature are adaptively adjusted based on operating parameters observed at two different operating points of the force motor when the force motor temperature reaches a steady value and the feedback control term is within a predefined dead-band.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
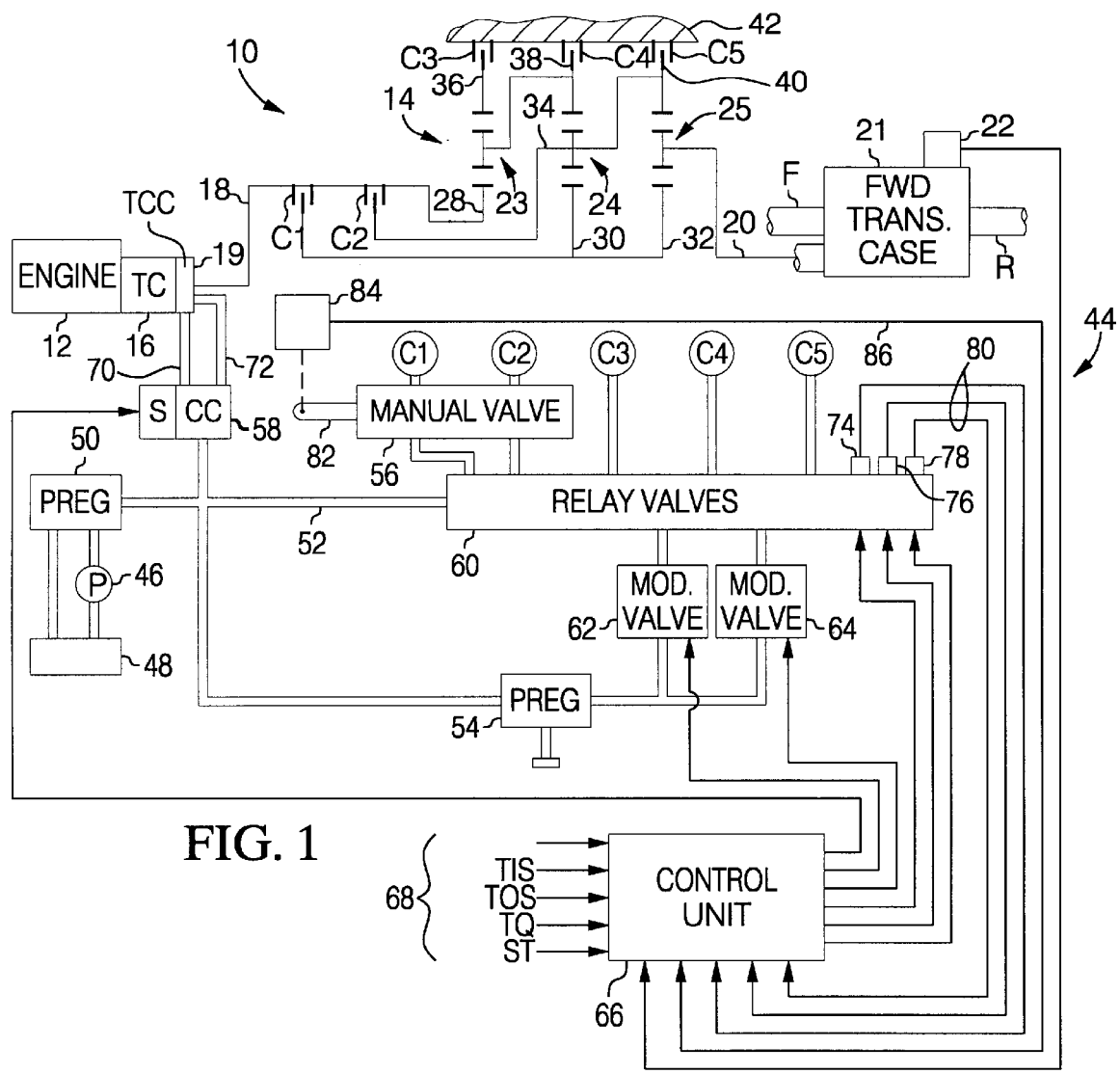
FIG. 1 is a diagram of an automatic transmission and microprocessor-based control unit for carrying out the control of this invention.
FIG. 2 is a diagram indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one speed forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64. The electronic portion of the control is primarily embodied in the microprocessor-based control unit 66, which suitably activates the solenoid operated fluid control valves 58–64 based on a number of inputs 68 to achieve a desired transmission speed ratio. The inputs 68 may include, for example, signals representing the transmission input speed TIS, the the driver torque command TQ, and in the illustrated embodiment, the transfer case output speed TCOS. Sensors for developing such signals may be conventional in nature, and have been omitted for simplicity. Additionally, the control lever 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The control unit 66 determines pressure commands for smoothly engaging the on-coming clutch while smoothly disengaging the off-going clutch, develops corresponding force motor current commands (Icmd), and then supplies current to the respective force motors in accordance with the current commands as explained below.

Obviously, the pressure control provided by the modulated valves 58, 30 62, 64 is only as good as the current control of control unit 66. As indicated above, accurate current control is difficult to achieve, particularly under dynamic conditions, due to circuit variations (such as wire harness length) and the wide temperature variations (−40° C. to +150° C.) of the hydraulic fluid in which the valves 58, 62, 64 are immersed.

The present invention is directed to an improved control that quickly and accurately supplies force motor current in accordance with the current command (Icmd). In the illustrated embodiment, the force motor current is controlled by pulse-width-modulation of the supply voltage (Vsupply). In general, the control includes feed-forward and feed-back control terms that are summed to determine a force motor duty cycle for achieving a current command Icmd. The feed-forward control term (DCff) is an estimate of the force motor duty cycle required to achieve the current command, based on the hydraulic fluid temperature (Tsump), Vsupply, and a model of the force motor circuit. The feed-back control term (DCfb) is based on the error between an expected current value and a measure of the actual current, and is designed to correct for modeling errors, providing improved disturbance rejection and command following. Finally, the feed-forward control is adaptively adjusted so that the estimated force motor duty cycle DCff more nearly produces the commanded current Icmd.

Figure 3:
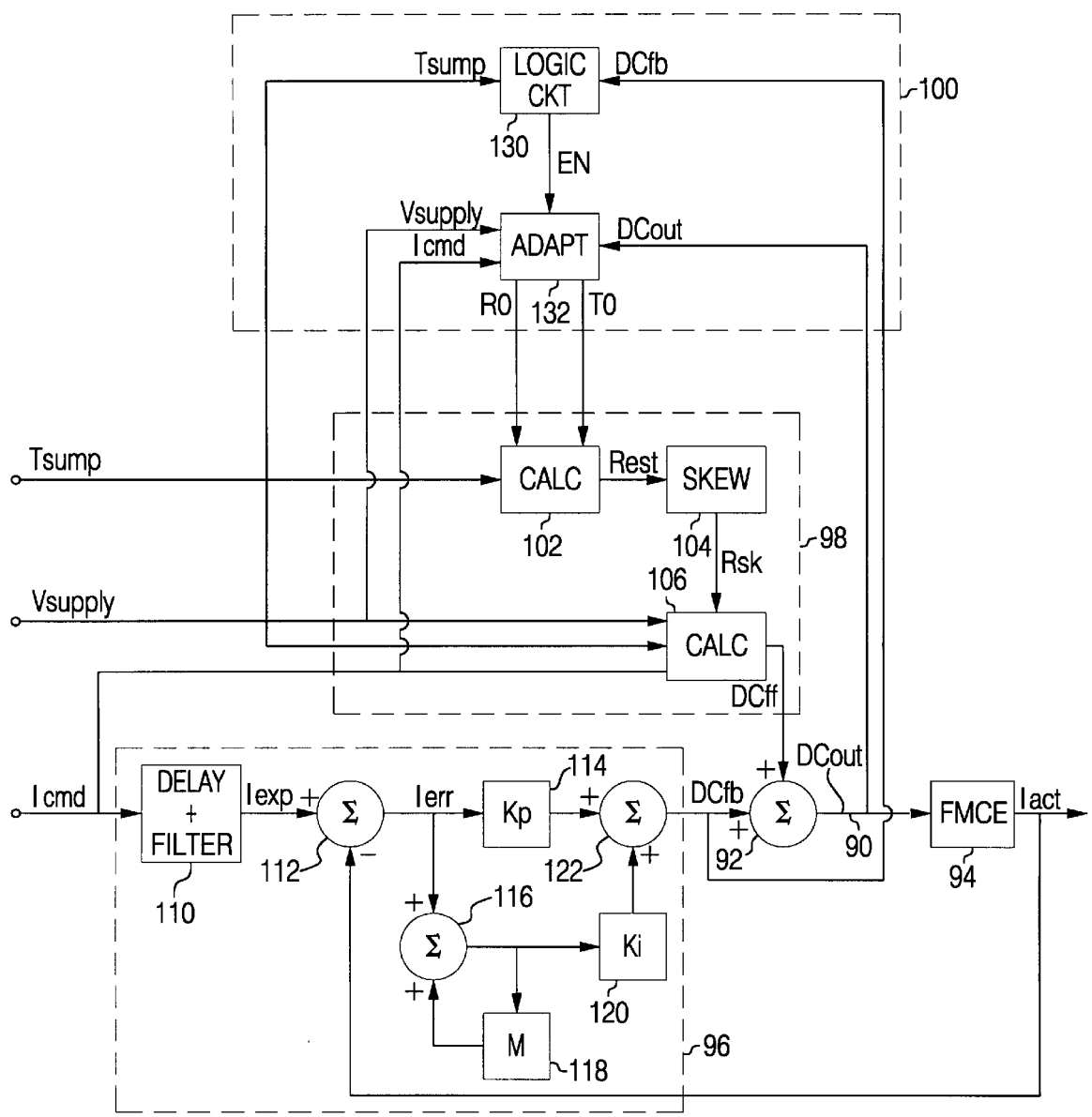
FIG. 3 is a block diagram illustrating the control carried out by the control unit of FIG. 1 according to this invention.

A block diagram of the current control carried out by the control unit 66 according to this invention is depicted in FIG. 3. The inputs Tsump, Vsupply and Icmd are used to develop a force motor PWM duty cycle (DCout) on line 90, based on the sum of a feedback duty cycle (DCfb) and a feed-forward duty cycle (DCff). The summer 92 develops DCout, and activates the force motor circuit accordingly. The block 94 (FMCE) represents the electromagnetic characteristics (inductance and resistance) of the force motor circuit (including wiring harness and solenoid coil winding), and the output Iact represents the average current actually supplied to the force motor. The feedback duty cycle DCfb is developed by the feedback control circuit 96, and the feed-forward duty cycle DCff is developed by the feed-forward control circuit 98. An adaptive control circuit 100 adaptively adjusts two inputs (nominal resistance Ro and nominal temperature To) used by the feed-forward control circuit 98.

The feed-forward duty cycle DCff is an estimate of the PWM duty cycle required to achieve Icmd, and therefore, is ordinarily the principle component of the output duty cycle DCout. The feed-forward duty cycle DCff is determined by calculating an estimate (Rest) of the force motor circuit resistance in block 102, skewing Rest in block 104 to achieve a desired over-damped response, and calculating DCff at block 106 based on Vsupply, Icmd and the skewed estimated resistance Rsk. The calculation of Rest in block 102 is based on the equation:

$$Rest = Ro*[1+\alpha(Tsump-To)]$$

where To is a reference temperature, Ro is a reference resistance of the circuit at temperature To, and α is the thermal resistivity constant for copper, in Ω/° C. The reference resistance Ro and temperature To are initially determined by calibration, and then adaptively adjusted by the adaptive control circuit 100, as explained below. The skewing of Rest at block 104 involves adjusting Rest downward to Rsk so as to attenuate the change in the feed-forward duty cycle DCff in response to a step change in Icmd; this results in an over-damped transient response characteristic, which prevents overshooting of the commanded current. In practice Rsk is computed according to the equation:

$$Rsk = Gsk*Rest$$

where Gsk is the resistance skewing gain. The gain Gsk determines how overdamped the system is, and may be set based on modeling or empirical data to achieve a balance of excellent consistency without overshoot and fast step response.

Finally, the calculation of DCff at block 106 is carried out according to the equation:

$$DCff=DCos+Icmd\ [Rsk/Vsupply]$$

where DCos is an offset duty cycle. Alternatively, DCos may be omitted; in such case, a non-zero offset is maintained by the feed-back control circuit 96 when the steady-state current error is zero.

The feed-back duty cycle DCfb corrects for modeling errors in feed-forward control circuit 98, and adjusts DCout for various disturbances that change the force motor current Iact. Initially, the current command Icmd is delayed and filtered at block 110 based on known response characteristics of the force motor circuit to produce an output Iexp that, under ideal conditions, would equal the average force motor current. The summing junction 112 then computes the current error Ierr according to the difference (Iexp−Iact). A proportional gain Kp is applied to Ierr at block 114 to form a proportional component of the feed-back duty cycle DCfb, and the blocks 116, 118 and 120 use Ierr to form an integral component error. The term Ki at block 120 is an integral gain term, and the block 118 is a memory (M) or unit delay. The proportional and integral components are summed at block 122, forming the feed-back duty cycle DCfb. Since the feed-back control circuit 96 takes into account the known response characteristics of the force motor circuit, DCfb responds primarily to modeling errors, thereby improving disturbance rejection and command following.

Figure 4:
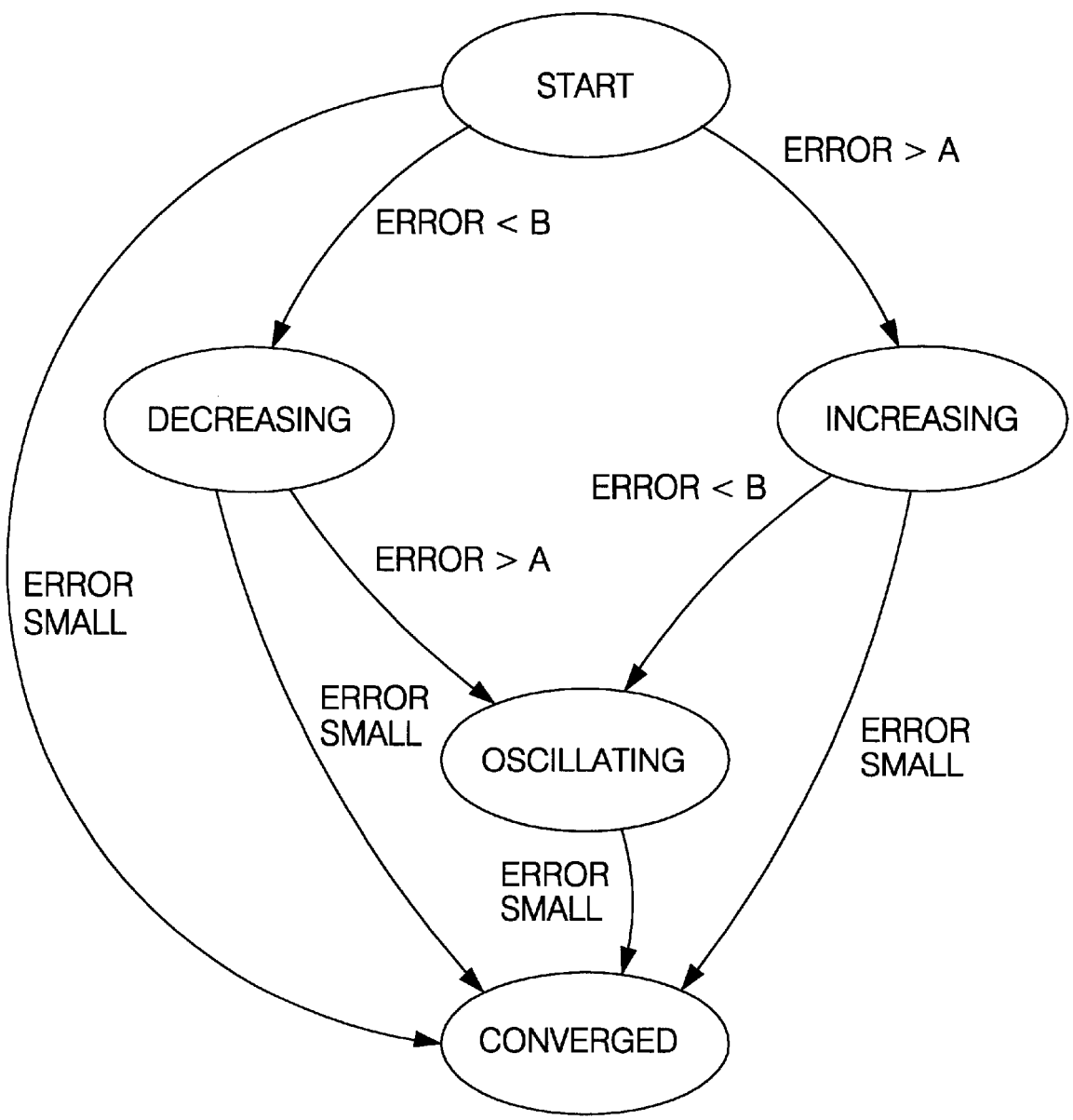
FIG. 4 is a state diagram illustrating an adaptive gain scheduling technique.

The adaptive control circuit 100 periodically adjusts the reference resistance and temperature inputs Ro, To utilized by block 102 of the feed-forward control circuit 98. The logic circuit block 130 monitors Tsump and DCfb to identify a condition of substantially constant temperature (stable Tsump) and substantially zero closed-loop error (|DCfb|<threshold), which represent the entry conditions for adaptive adjustment. If the entry conditions are met, block 130 enables block 132 to adaptively adjust Ro and To. The adaptive adjustment involves storing DCout, Vsupply and Icmd at two (or more) operating points—that is, two (or more) different values of Icmd. It is assumed that the force motor circuit is linear between the two operating points, and the block 132 computes the adaptive force motor circuit resistance Radapt according to the equation:

$$Radapt=(DCout_1-DCout_2)/[(Icmd_1/Vsupply_1)-(Icmd_2/Vsupply_2)]$$

where the subscript 1 designates data recorded at the first operating point, and the subscript 2 designates data recorded at the second operating point. The temperature value Tsump common to both operating points becomes the new reference temperature To, and the new reference resistance Ro(new) is computed with a first order filter according to the equation:

$$Ro(new)=Ro(prev)+Gadapt[Radapt-Ro(prev)]$$

where Ro(prev) is the reference resistance before adaptive adjustment, and Gadapt is an adaptive gain term. The adaptive gain term Gadapt is scheduled to allow more adaptive authority (higher gain) if the adaptive resistance Radapt is successively increasing or successively decreasing, and less adaptive authority (lower gain) if the Radapt is alternately increasing and decreasing (oscillating) or converging on one value. This concept is best illustrated by the state diagram of FIG. 4, which depicts an initial state (Start) and four other states: Increasing, Decreasing, Oscillating and Converged. After the first adaptive adjustment of Ro in a period of vehicle operation, the state changes from Start to Increasing, Decreasing or Converged depending on the difference (Radapt−Ro(prev)). The state is Increasing if the difference is higher than a positive threshold A, Decreasing if the difference is lower than a negative threshold B, and Converging if the magnitude of the difference is less than a threshold C. Prior to convergence, the state can change to Oscillating if the Increasing and Decreasing conditions are successively met, as indicated by the diagram. The gain Gadapt is highest when the state is Increasing or Decreasing, lowest when the state is Converged, and at an intermediate (or small) value when the state is Oscillating.

In summary, the control of this invention provides an improved force motor current control that exhibits a fast response rate without overshoot, and that is relatively easy to calibrate. Furthermore, the adaptation to correct transient response occurs very quickly, making the control robust to temperature, voltage, and resistance variations. While described in reference to the illustrated embodiment, it will be understood that various modifications in addition to those mentioned above will occur to those skilled in the art. For example, the force motor temperature may be modeled (based on power dissipation characteristics) rather than simply Tsump, and so on. Broadly, it should also be understood that the described control and its variants may be applied in various other solenoid current control applications. Thus, it will be understood that controls incorporating these and other modifications may fall within the scope of this invention, which is defined by the appended claims.

What is claimed is:

1. A control method for activating a circuit including solenoid operated device with a voltage source in response to a current command, the method comprising the steps of:
   estimating a resistance of the circuit based on a temperature of the device, a reference temperature and a reference resistance;
   developing a feed-forward activation value for achieving the commanded current based on the estimated resistance and a voltage of said source;
   activating the device with the voltage source in accordance with the feed-forward activation value;
   measuring a current actually supplied to the circuit;
   adjusting the feed-forward activation value in accordance with a feed-back adjustment based on a deviation of the measured current from an expected current; and
   adaptively adjusting the reference temperature and reference resistance when the measured current is substantially equivalent to the expected current.

2. The control method of claim 1, wherein the reference resistance is an estimate of a resistance of the circuit at the reference temperature.

3. The control method of claim 1, wherein the step of developing a feed-forward activation value includes the step of:
   skewing the estimated resistance in a downward direction to achieve an over-damped transient response to step changes in the current command.

4. The control method of claim 1, wherein the expected current is determined by delaying and filtering the current command based on a known transient response characteristic of said circuit.

5. The control method of claim 1, wherein the feed-back adjustment is determined by proportional-plus-integral control, and the reference temperature and reference resistance are adaptively adjusted when the feedback adjustment is indicative of substantially zero error between the measured and expected currents.

6. The current control of claim 1 wherein the step of adaptively adjusting the reference temperature and reference resistance includes the steps of:

identifying a period of operation during which the temperature of the device is substantially constant;

storing operating parameters of the control at first and second operating points of the circuit during said identified period of operation;

calculating an adaptive reference temperature based on the stored operating parameters; and adjusting the reference temperature in accordance with the temperature of the device during said identified period of operation, and adjusting the reference resistance in accordance with the adaptive reference temperature.

7. The current control of claim 6, wherein the operating parameters of the control include the source voltage, the current command, and the adjusted feed-forward activation value.

8. The current control of claim 7, wherein the adaptive reference temperature is calculated according to the expression:

$$(DCout_1 - DCout_2)/[(Icmd_1/Vsupply_1) - (Icmd_2/Vsupply_2)]$$

where $DCout_1$ and $DCout_2$ are the adjusted feed-forward activation values at the first and second operating points, $Icmd_1$ and $Icmd_2$ are the current commands at the first and second operating points, and $Vsupply_1$ and $Vsupply_2$ are the source voltages at the first and second operating points.

9. The current control of claim 6, wherein the step of adjusting the reference resistance in accordance with the adaptive reference temperature includes the steps of:

calculating a new reference resistance according to the expression:

$$Ro(prev) + Gadapt[Radapt - Ro(prev)]$$

where Radapt is the calculated adaptive reference temperature, Ro(prev) is a current value of the reference resistance, and Gadapt is an adaptive gain value; and setting the reference resistance equal to the new reference resistance.

10. The current control of claim 9, including the step of:

adjusting the adaptive gain value Gadapt based on a detected variation of the calculated adaptive reference temperature Radapt.

11. The current control of claim 10, wherein the adaptive gain value Gadapt is set to a first value that provides increased adaptive authority if the calculated adaptive reference temperature Radapt is successively increasing or successively decreasing, and to a second value that provides decreased adaptive authority if the calculated adaptive reference temperature Radapt is alternately increasing and decreasing or alternately decreasing and increasing.

12. The current control of claim 11, wherein the adaptive gain value Gadapt is set to a third value that provides decreased adaptive authority if a difference between successively calculated adaptive reference temperatures is less than a threshold.

* * * * *